UNITED STATES PATENT OFFICE.

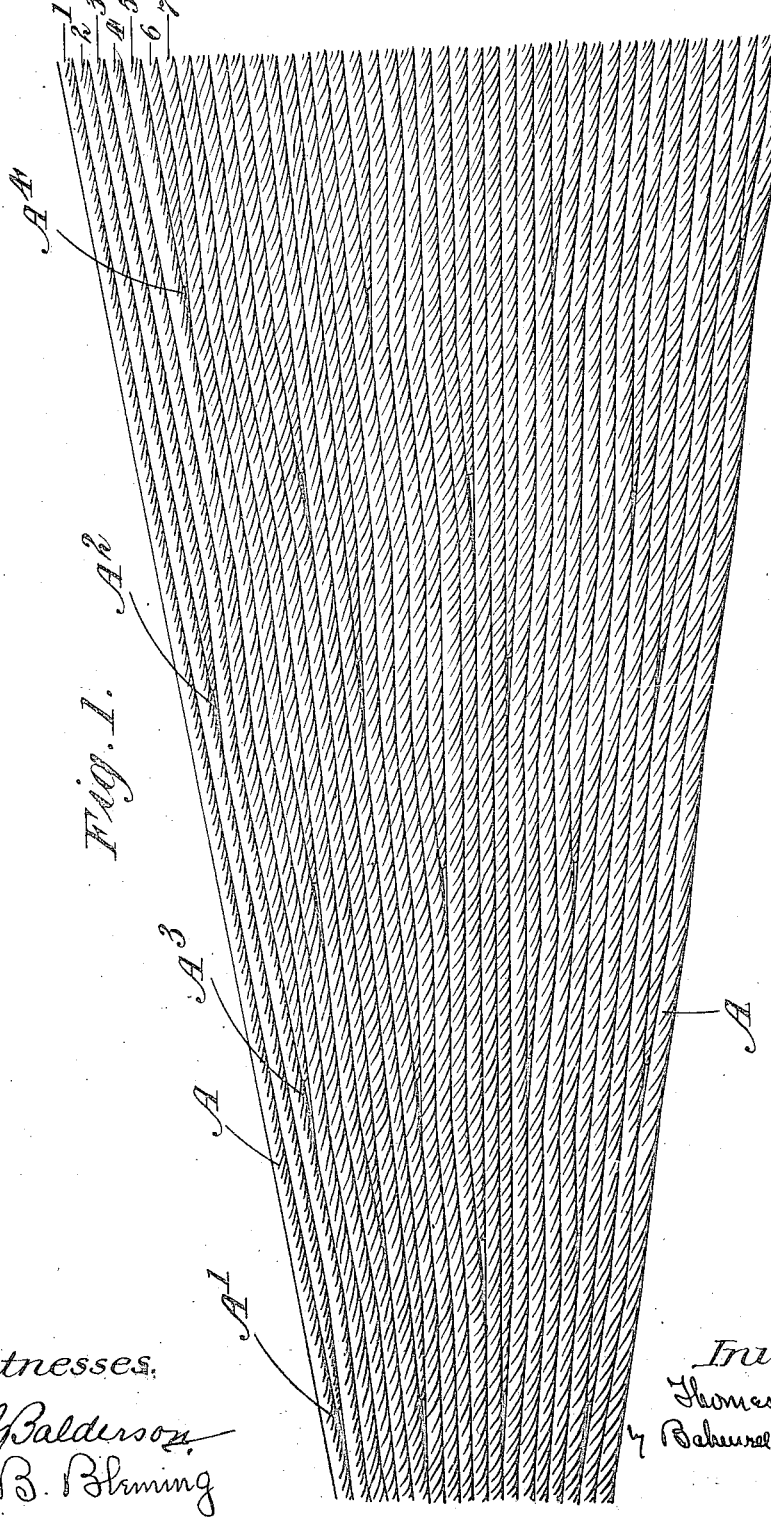

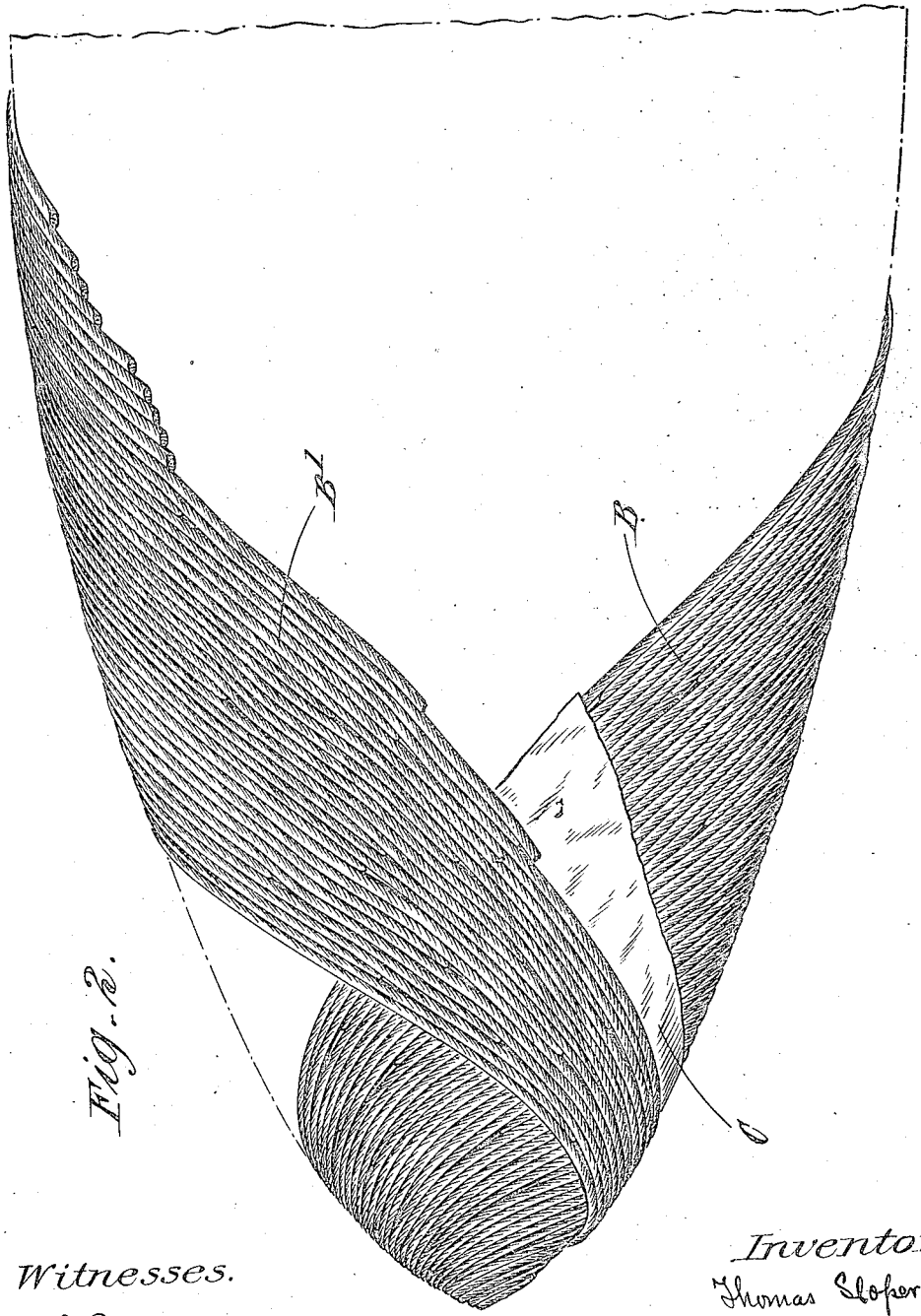

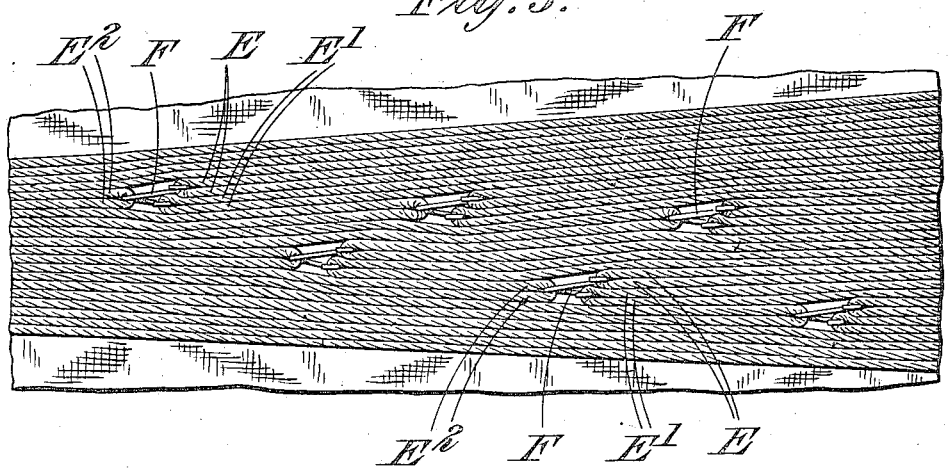
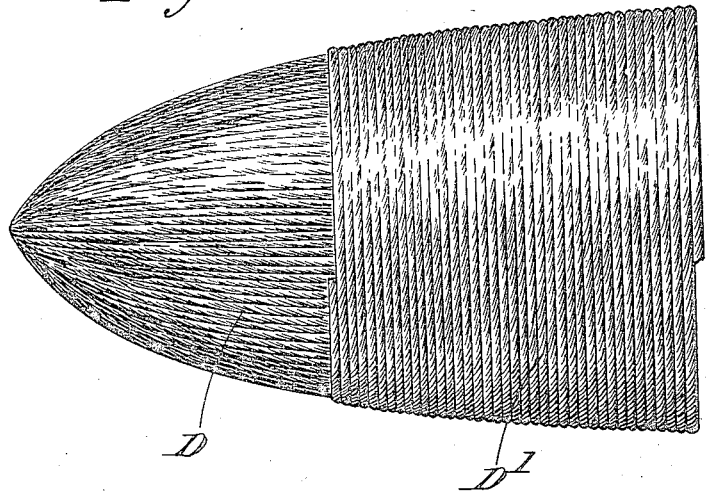

THOMAS SLOPER, OF DEVIZES, ENGLAND.

METHOD FOR FORMING GAS-BAGS OR OTHER FLUID-RETAINING ENVELOPS FOR AIRSHIPS OR OTHER PURPOSES.

1,140,921.　　　　Specification of Letters Patent.　　Patented May 25, 1915.

Application filed November 3, 1914.　Serial No. 870,048.

*To all whom it may concern:*

Be it known that I, THOMAS SLOPER, a subject of the King of England, residing at Devizes, in Wiltshire, England, have invented certain new and useful Improvements in Methods for Forming Gas-Bags or other Fluid-Retaining Envelops for Airships or other Purposes, of which the following is a specification.

This invention is for improvements in or relating to gas-bags or other fluid-retaining envelops for airships or other purposes and has particular reference to the production of the fabric of such gas-bags or envelops. The fabric proposed to be used for this purpose is built up of layers of parallel threads without any interweaving, the threads in each layer merely lying side by side and the thickness of the layer being that of the thickness of the individual threads. The threads in one layer are laid transversely to those in the other, the angle at which they are laid being varied according to circumstances, for example, the threads in one layer may be disposed at right-angles to those in the other, or they may be at any angle other than parallel with the same. The threads so laid are embedded in india-rubber, gum or the like, and may themselves be treated with rubber if desired. The rubbered or other threads may be laid together in one layer and covered with a thin sheet of rubber, the next layer of threads being laid on the thin sheet of rubber, and the whole vulcanized together with or without a further coating of rubber or other layers of threads. The material so far described is well-known and in itself forms no part of the present invention.

It will be appreciated that the fabric just described could be used for gas-bags and other purposes, but the main object of the present invention is to apply this fabric to the manufacture of gas-bags in such a manner that the bag can be made to take the required shape without overlapping of the threads or folding of the material at parts which are constricted, such as the tapered ends of a cigar-shaped gas-bag. These folds only increase the weight of the whole envelop, which it is required to keep as low as possible, and the material contained in these folds is not required for the purpose of strength.

According to the present invention, therefore, there is provided for gas-bags or other fluid-retaining envelops a fabric of the kind described, wherein the constriction of a given layer in a direction transverse to the lay of its threads is obtained without overlapping of the threads by dropping out threads at the part to be constricted and drawing the remaining threads together (for example at the tapered ends of a cigar-shaped gas-bag) the points at which the threads are dropped out being so chosen in the transverse direction that a wide break is not formed and so selected in the direction of lay as to give the required shape to the constriction; thus if a sharp taper is required the threads would be dropped out at points in the direction of their length which would be nearer one another than would be the case if a long taper was required, or fewer threads could be dropped out at each step in the direction of the lay of the threads.

Various methods may be employed for dropping out the threads, for example, the threads which are to be dropped out may be merely shorter than those which are to continue further in the direction of lay, or a plurality of threads may be connected end-to-end at the point where the drop out is to occur to a single or smaller number of threads, or to an equal number of threads which occupy less space than those to which they are connected.

In the accompanying drawings:—Figure 1 shows one layer of a piece of fabric with threads dropped out according to one method of carrying out this invention; Fig. 2 shows two layers of a piece of fabric with threads dropped out according to the same method of carrying out this invention, but with the threads in the layers differently arranged from those shown in Fig. 1; Fig. 3 shows a piece of fabric with the threads dropped out according to another method of carrying out this invention, and Fig. 4 shows another arrangement of the threads in which threads are dropped out in one layer only.

The same letters indicate the same parts throughout the drawings.

The layer of fabric shown in Fig. 1 comprises a series of threads A laid side by side, individual threads being dropped out at intervals as shown at $A^1$, $A^2$, $A^3$, $A^4$, and so on. It will be noted that the thread A which lies at the edge of the fabric is continuous right through, whereas the next thread drops out at $A^1$, and the third thread drops out at $A^2$, which is set some way back from $A^1$. The fourth thread is again continued right through the fabric, the fifth thread being dropped out at $A^3$ which is at a point intermediate between the points $A^1$ and $A^2$, and the sixth thread is dropped out at $A^4$ being set back about the same distance from $A^2$ as the point $A^3$ is forward of $A^2$, and the seventh thread is again continued right through the whole length. The object of this arrangement is to prevent unnecessary weakening of the fabric by dropping out too many threads in close proximity one to the other.

The layer shown in Fig. 1 may be covered with another layer having the threads disposed transversely to those of the first layer, a sheet of rubber conveniently being interposed between the two layers, and the whole can be vulcanized together each thread having been previously impregnated with rubber according to the well-known method of building up rubbered cord fabrics.

In Fig. 2 one arrangement of two layers of this fabric is shown. The figure shows the conical end portion of a cigar-shaped gas-bag, and one layer B is placed with the threads in the form of a wide-pitch left-handed spiral and the other layer $B^1$ with the threads in a wide-pitch right-handed spiral, so that the two lots of threads cross approximately at right-angles to each other; a thin sheet of rubber C is indicated between the two layers.

It will be appreciated that the layers B and $B^1$ are built up by dropping out the threads in the manner shown in Fig. 1, but the threads instead of being laid quite straight are spiral, as already stated.

Instead of laying the threads in the form of two spirals, one layer may be laid straight as indicated at D, Fig. 4, and then the outer layer $D^1$ may be wound in the form of a close spiral around the layer D, but in such case the layer $D^1$ will have no threads dropped out from it, as to constrict it at the tapered end it is clearly only necessary to reduce the diameter of the spirals.

In Fig. 3 a method is shown of dropping out threads according to which two double threads, E $E^1$ are connected to a single double thread $E^2$ by means of a hook F. The hook has one claw at one end and two claws at the other end, so that a thread E can be looped around one claw and carried back, a thread $E^1$ looped around its companion claw and carried back, and then a thread $E^2$ looped around a claw at the opposite end of the hook and carried back, so that what is practically four threads, E, $E^1$ give place to two threads $E^2$. This is a means of dropping out threads without actual disconnection as the threads E, $E^1$ are connected end to end to the double thread $E^2$ by means of the hook, and in some cases this means of dropping out may be preferred to that already described. The arrangement of the threads for the layer may be the same as that already described with reference to Figs. 1, 2 and 4, except that the hooks take the places of the gaps which occur in those constructions at the immediate points where the dropping out of the threads occurs. Obviously instead of using hooks, the threads E, $E^1$ and $E^2$ might be hitched direct together by any convenient form of knot or interlooping, and the hook could thus be dispensed with. Again, the threads whether engaged with a hook or hitched together, need not be double threads, thus two threads or one double thread could be connected to a single thread, or instead of reducing the number of threads connected end to end, the same number of threads could be used but of a smaller size so that they occupy a smaller space and permit of the desired constriction of the fabric.

Whatever arrangement of threads and whatever means of dropping the threads out is employed, the object of the present invention is to obtain an arrangement whereby constrictions in the layer can be produced without overlapping of the threads with its increase of weight and unnecessary increase of strength at such points, and the dropping out of the threads as described enables those of each layer to be always kept within the thickness of the layer, which thickness is that of the individual threads. Obviously any number of layers may be employed according to the purpose for which the fluid-retaining envelop is to be used but all such combinations of layers and dispositions of the threads therein would fall within the scope of this invention, provided one or more of the layers has the threads dropped out at the parts which are to be constricted without folding or overlapping.

This invention is not restricted to envelops which completely inclose the fluid, but can be applied to those through which fluid flows, for instance it could be applied to conical or tapering hose-pipe.

Although threads have been referred to throughout this specification, it will be understood that this term is used generically and would include cord, the size of the material used varying according to the purpose to which it is to be applied and the part of the bag or envelop in which it is employed.

What I claim as my invention and desire to secure by Letters Patent is:—

1. A method for forming a fabric for fluid-retaining envelops consisting in building up the layer of fabric by laying threads side-by-side without any interweaving, and dropping out threads at points where the fabric is to be constricted in a direction transverse to the lay of the threads, the points of dropping out the threads being so chosen in the transverse direction that a wide break is not formed and so selected in the direction of lay as to give the required shape to the constriction when the remaining threads are drawn together, substantially as set forth.

2. A method for forming a fabric for fluid-retaining envelops consisting in building up the layer of fabric by laying threads side-by-side without any interweaving, and dropping out threads at points where the fabric is to be constricted in a direction transverse to the lay of the threads, such dropping out being effected by connecting a plurality of threads to a smaller number of threads, the points for dropping out the threads being so chosen in the transverse direction that a wide break is not formed and so selected in the direction of lay as to give the required shape to the constriction when the remaining threads are drawn together, substantially as set forth.

3. A method for forming a fabric for fluid-retaining envelops consisting in building up the layer of fabric by laying threads side-by-side without any interweaving, and dropping out threads at points where the fabric is to be constricted in a direction transverse to the lay of the threads, such dropping out being effected by connecting a plurality of threads to a smaller number of threads, hooks being employed for connecting the larger number of threads to the smaller number, and the points for dropping out the threads being so chosen in the transverse direction that a wide break is not formed and so selected in the direction of lay as to give the required shape to the constriction when the remaining threads are drawn together, substantially as set forth.

4. A method for forming a cigar-shaped fluid-retaining envelop consisting in building up the envelop fabric with one layer of threads placed side-by-side without any interweaving, the said threads being laid in the form of a wide-pitch spiral around the longitudinal axis of the envelop, some of the threads being dropped out at the tapered end so that the fabric can there be constricted to form the taper without overlapping of the threads, the points for dropping out the threads being so chosen in the transverse direction of the lay of the threads that a wide break is not formed and so selected in the direction of lay as to give the required taper when the remaining threads are drawn together, a second layer of threads being placed over the first, the direction of lay in this second layer being transverse to that of the first layer, substantially as set forth.

5. A method for forming a cigar-shaped fluid-retaining envelop consisting in building up the envelop fabric with one layer of threads placed side-by-side without any interweaving, the said threads being laid in such direction that they advance from the middle to the end of the envelop, some of the threads being dropped out at the tapered end so that the fabric can there be constricted to form the taper without overlapping of the threads, the points for dropping out the threads being so chosen in the transverse direction of the lay of the thread that a wide break is not formed and so selected in the direction of lay as to give the required taper when the remaining threads are drawn together, a second layer of threads being placed over the first in the form of a continuous winding the lay of whose threads is approximately at right-angles to the longitudinal axis of the envelop, substantially as set forth.

In testimony whereof I have signed my name to this specification in the presence of two subscribing witnesses.

THOMAS SLOPER.

Witnesses:
 ALFRED NUTTING,
 O. J. WORTH.